3,303,788
ROTARY MACHINES
André Miéville, Lausanne, Switzerland, assignor to
Hydrolec S.A., Geneva, Switzerland, a firm
Filed Feb. 23, 1965, Ser. No. 434,360
Claims priority, application Switzerland, Feb. 25, 1964,
2,271/64
2 Claims. (Cl. 103—87)

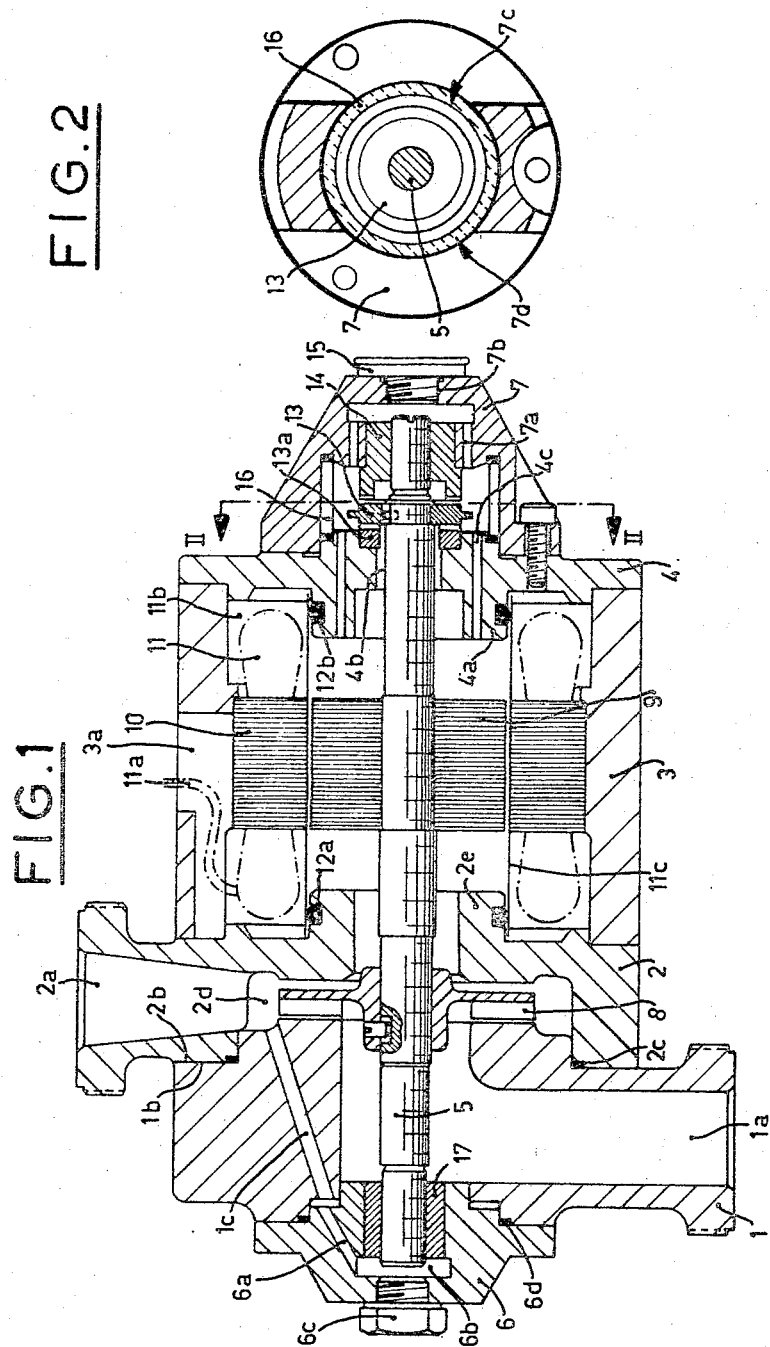

The present invention relates to a rotary machine, comprising at least one shaft rotating in a sealed enclosure and at least two bearings supporting said shaft which is loosely fitted in the Babbitt part of at least one of them.

Said machine is characterized in that the latter bearing is mounted in a flange removably fixed to said enclosure.

The features of the present invention will be disclosed hereafter, the form of embodiment chosen by way of example being a motor pump, reference being had to the accompanying drawing, in which:

FIG. 1 is a longitudinal section of said motor pump and

FIG. 2 is a cross-section thereof, along II—II of FIG. 1.

The motor pump shown in the drawing (FIG. 1) comprises a frame formed of four elements 1 to 4, within which is mounted a rotary shaft 5 pivoting at both extremities in flange 6 and 7 fixed to said frame and carrying a paddle-wheel 8 and also the rotor 9 of an electric motor, the stator of which being shown at 10, its inductive winding being referenced 11.

Element 1 of the frame, which comprises the suction duct 1a of the pump, articulated to element 2 (the latter comprising the discharge duct 2a) by direct contact of its bearing surface 1b, is an annular seat 2b of element 2 of the frame; the tightness between elements 1 and 2 is obtained by means of a sealing joint 2c, and one of these elements is clamped with respect to the other at a given angular position by means of bolts which engage cramps (again not shown) of elements 1 and 2.

In addition, elements 1 and 2 of the frame are so shaped as to define between them an annular space 2d which wraps the paddle-wheel 8 and constitutes for the latter a chamber which is similar to the spiral casing of conventional pumps.

Element 3 of the machine frame also forms the frame of the electric motor and is fastened to element 2 by means of bolts (not shown); an opening 3a allows the passage of connections 11a for feeding current to the stator winding 11. The feeding of annular space 11b in which said winding is located, is ensured in known manner by a sleeve 11c tightly mounted by means of joints 12a and 12b in annular grooves dug in the edges of cylindrical embossments 2a and 4a of elements 2 and 4.

Element 4 of the frame is a disk tightly fixed to element 3 by means of bolts (not shown) and provided in its central portion with an opening 4b allowing the free passage of shaft 5; in the right-hand face of said disk is provided a housing into which is introduced a pellet of Babbitt metal 13a. An annular abutment 13, integral with shaft 5, ensures the axial positioning of said shaft by alternatively contacting portion 13a and the left-hand front face of a bearing 14 of Babbitt metal in which pivots the right-hand extremity of said shaft, loosely fitted therein. This bearing is force-fitted into the corresponding opening of flange 7 and it is lubricated by the water contained in the frame and reaching the bearing through an opening 4c made in disk 4 and a passage 7a provided in flange 7.

As shown, flange 7, of generally frusto-conical shape, is fixed to disk 4 by its larger base, whereas the smaller base thereof carries a dial thermometer 15 in a threaded opening 7b of flange 7; said thermometer 15 serves to indicate the temperature of the fluid flowing through the motor-pump. It can of course include a series of contacts producing the starting and stopping of said motor-pump whenever the temperature reaches a given level as it rises or decreases.

The frusto-conical surface of flange 7 is so cut as to define in said flange two lateral openings 7c and 7d located level with the abutment 13 which they permit to observe. These openings are obturated by a sleeve 16 of a translucent substance, tightly mounted between flange 7 and disk 4. Preferably, abutment 13 bears on the edge thereof a colored arrow indicating the normal direction of rotation of the pump.

Shaft 5 is mounted by its left-hand extremity, as viewed in the drawing, within a bearing 17, into which it is loosely fitted and which is fixed to flange 6; the lubrication of said bearing is also achieved by the liquid pump through a duct 1c provided in element 1 of the frame and a second duct 6a dug in flange 6 and opening into a chamber 6b of the latter; reference numeral 6c designates a plug which permits to drain the motor pump. Flange 6 is fixed onto element 1 by means of bolts (not shown), and the tightness is achieved by interposing a sealing joint 6b.

As explained, shaft 5 is loosely fitted into bearings 14 and 17; moreover, flanges 6 and 7 are removably mounted on the motor pump. It is thus possible to replace either of said motor pump bearings by simply unscrewing the bolts which fasten the corresponding flange to the machine frame, and by causing the flange to longitudinally slide, with a view to releasing the bearing from the extremity of shaft 5 which it wraps. That specific mounting thus permits to replace the bearings at once without requiring the complete dismounting of the motor pump, as is the case with known motor pumps, and without requiring that said motor pump be sent to a repairing workshop or to the factory.

In addition, the special geometry of the frame of said motor pump permits to easily adapt the latter to installations of all types, even to known installations, by merely angularly displacing element 1 comprising the suction duct with respect to element 2 carrying the discharge duct, and by clamping together these two elements of the frame by tightening the corresponding bolts.

Finally, it will be noted that the location and sizes of the openings of flange 7 are such that they permit to easily determine the direction of rotation of the motor pump.

While the above description and the accompanying drawing merely contemplate a motor pump, it is quite obvious that the present invention also applies to other types of rotary machines with a sealed enclosure, such as for instance compressors, water-, gas- or steam-turbines, gear boxes, vane pumps.

What is claimed is:
1. A horizontal pump having a frame and;
    (A) a horizontal rotary shaft carrying a paddle wheel and a rotor for an electric motor, said shaft fitting in bearings on opposite ends of said frame;

(B) flanges securing said bearings to said frame; at least one of said flanges being removably secured to said frame;

(C) suction and discharge ducts transverse to said shaft and inwardly disposed in said frame with respect to said flanges, whereby said removable flange or flanges can be removed without complete disassembly of said pump.

2. Pump according to claim 1, wherein said removable flange has frusto-conical shape.

References Cited by the Examiner

UNITED STATES PATENTS

| | | | |
|---|---|---|---|
| 784,715 | 3/1905 | Virtue. | |
| 2,263,719 | 11/1941 | Davies | 103—87 |
| 2,518,597 | 8/1950 | Brooks | 103—87 |
| 3,010,401 | 11/1961 | Granqvist | 103—25 |
| 3,031,973 | 5/1961 | Kramer | 103—87 |
| 3,138,106 | 6/1964 | Lebkuchner | 103—87 |

ROBERT M. WALKER, *Primary Examiner.*